Feb. 10, 1931.  W. R. MATTHEWS  1,792,385
ELECTRIC MEASURING INSTRUMENT
Filed July 22, 1929
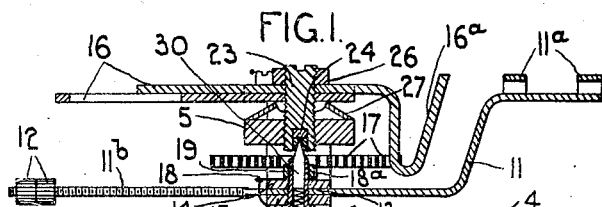

Patented Feb. 10, 1931

1,792,385

UNITED STATES PATENT OFFICE

WALTER RICHARD MATTHEWS, OF WILLESDEN, LONDON, ENGLAND

ELECTRIC MEASURING INSTRUMENT

Application filed July 22, 1929, Serial No. 380,050, and in Great Britain June 4, 1925.

This invention relates to electric measuring instruments of the moving coil type for use on direct current circuits, and the present application is a continuation-in-part of the application filed by me on January 3, 1926, Serial Number 79,393. The invention has for its object to provide an electric measuring instrument of the type above set forth which shall give maximum reliability and accuracy in working notwithstanding heavy jarring shocks or vibrations to which the instrument may be subjected, and wherein liability of damage to the pivots and bearings of the moving coil is eliminated.

The invention consists of an electric measuring instrument of the moving coil type comprising in combination the various elements or devices substantially as hereinafter described with reference to the accompanying drawings and set forth in the appended claims.

More particularly the invention consists principally in the combination, in an electric measuring instrument of the type above set forth, of a novel and highly useful construction and arrangement of the pivots and pivot bearings of the moving coil or movable element of the instrument.

In the accompanying drawings which illustrate the invention,—

Fig. 1 is a sectional elevation of certain known parts of an electric measuring instrument of the moving coil type, and shows a moving coil having pivots constructed and arranged according to this invention.

Fig. 2 is a similar view to Fig. 1 turned through an angle of 90°, certain of the parts shown in Fig. 1 being omitted.

Fig. 3 is a plan view of Fig. 1 turned through 90°.

Fig. 4 is a plan view of one of the pivot carrying plates or clamps with pivot secured thereto, this figure showing the parts for assembly on the moving coil of the instrument.

Fig. 5 is a sectional elevation of the plate or clamp with pivot shown in Fig. 4.

Fig. 6 is a sectional elevation of one of the adjustable plugs or pillars with the jewel bearing therein and constituting an adjustable bearing, the figure showing the end of the pivot in the bearing.

For clearness of illustration the parts shown have been drawn to a much larger scale than in the instrument from which the drawings were made.

Referring to the drawings, 1 indicates the stirrup frame and 2 the core iron fixed, as shown, to the vertical sides or side members 1ª, 1ᵇ of the stirrup frame, 3 being the screws fixing the core iron 2 to the side members 1ª, 1ᵇ. 4 is an annular plate or flange on the upper ends of the side bars or members 1ª, 1ᵇ of the stirrup frame 1, 5 the bridge bar carried by the flange 4 and secured thereto by screws 6 and nuts 7, the said screws extending through distance pieces or ferrules 8 into holes between the flange 4 and bridge bar 5, 9 being rings or collars of insulating material located between the upper ends of the ferrules 8 and the underside of the bridge bar 5 and 10 rings or collars of insulating material interposed between the upper side of the bridge bar 5 and the nuts 7. 11 is the arm which carries the usual pointer by which indications are given on the dial of the instrument, 11ª being the clips or tongues on the arm 11 by which the pointer (not shown) is held on the said arm, and 11ᵇ is the bifurcated or splayed tail portion of the arm 11 on which the usual adjustable counter-balance weights 12 are mounted, the members of the tail 11ᵇ being screw-threaded for adjustment of the weights 12 thereon. The central portion 13 (see Fig. 2) of the pointer carrying arm 11, 11ᵇ has the form of an annular plate whereby the said arm is supported on a socket or housing carrying the upper pivot of the moving coil hereinafter referred to, the said annular portion or plate 13 being interposed between insulating rings or collars 14, 15 mounted on the said socket or pivot holder. 16 is the usual zero adjuster to the hook-like end 16ª of which one end of the hair spring 17 is fixed, for instance, as usual, by being soldered thereon, and 18 is a small copper washer or plate comprising an upstanding part or tongue 18ª at one end of which, as shown in Fig. 1, the other end of the hair spring 17 is soldered or otherwise secured, the said washer or plate 18 being held in position by the nut 19, screwed down on the part of the upper spindle or pivot holder or socket.

The upper end of the wire 20 of the moving coil of the instrument is soldered to the above-mentioned small copper washer or plate 18, as shown in Figs. 1 and 2, and the lower end of said wire is similarly soldered at 20ª, Fig. 1, to a small copper plate or washer (similar to the above-mentioned plate or washer 18) attached to a part of the lower spindle or pivot of the moving coil. The inner end of the lower hair spring 17ª is secured, for instance soldered, to the vertical portion 18ᵇ (see Fig. 1) of the spring copper plate or washer associated with the lower spindle or pivot holder or socket, and the outer end of this hair spring is soldered or otherwise secured to the arm 21 formed integrally with the circular plate or member 22 mounted on and secured to the lower end or transverse part of the stirrup frame 1. 23 is the adjustable screw plug or pillar screwed into the lower end of the stirrup frame 1 and into the aforesaid circular plate or member 22, the said pillar 23 carrying the jewel bearing 24 for the lower pivot of the moving coil of the instrument. The upper pillar 23 with jewel bearing 24, constituting the adjustable bearing for the upper pivot of the moving coil, is screwed into the bridge bar 5 and is retained therein by means of a nut 26 which is screwed up on the pillar 23, the said nut also serving to hold the zero adjuster 16, 16ª in position, 27 (Figs. 1 and 2) being a spring washer interposed between the zero adjuster and the bridge bar 5.

28 is the frame or coil former around which the wire 20 is wound, the said frame with the wire wound thereon and pivots carried on its upper and lower ends constituting the moving coil of the instrument.

The moving coil 28 is, as usual, so assembled relative to the core iron 2 that the said coil surrounds or embraces the core iron with appropriate clearance so that in working the coil 28 can have free rotary movements about the core iron 2.

All the parts above described, to which reference numbers have so far been given, are of usual well-known construction and their arrangement or assembly together in the instrument is also as usual and well-known in electric measuring instruments of the moving coil type heretofore produced and employed.

In an instrument constructed according to this invention the jewel bearing 24 in each of the pillars 23 is held, in a cavity in the pillar, by means of a metal insert or ring 25 which latter is held in position by the metal of the pillar 23 at the outer end of the cavity therein being spun over the outer edge of the said metal insert 25 as shown at 23ª, Fig. 6, which latter figure shows clearly the form of the jewel bearing 24 and the method of holding same in the cavity in the screw pillar 23. The spun over stop on the pillar below the ring 25 prevents the jewel from being dislodged by a sudden jerk, as when the instrument is accidentally dropped on a hard floor. The said pillars 23 with the jewels 24 and metal inserts or rings 25 constitute the adjustable bearings for the upper and lower pivots of the moving coils of the instrument, and as these bearings are identical for both the upper and lower pivots they are given corresponding reference numbers in Figs. 1 and 2 of the drawings.

According to this invention with the objects hereinbefore set forth, namely the provision of an instrument which shall be highly sensitive, accurate and reliable in working and in which liability of damage to the pivots and bearings of the moving coil shall be eliminated, the moving coil 28 comprises on each end or on the upper and lower transverse portions of the frame coil 28 and secured thereto a socket or tubular housing 29, 29ª in which there is slidably fitted a conically pointed pivot pin 30 and in rear of the said pivot 30 a coil spring 31 within the bore or cavity of the said socket or housing. As shown in Figs. 1 and 2 each of the said sockets 29 and 29ª is so formed that exteriorly it comprises portions of different diameters the inner portion of the socket, adjacent to the coil 28 to which it is attached, being of larger diameter than the outer portion, from which the end of the conical point of the pivot projects, so that an annular shoulder is provided on the socket at the juncture of the smaller and larger diameter portions. Further as shown in Figs. 1 and 2 the larger diameter portion of the upper socket 29 is much longer than the larger diameter portion of the lower socket member 29ª, and the annular shoulder at the point of juncture of the larger and smaller diameter portions of the said socket 29 serves to support the hereinbefore-mentioned pointer carrying arm 11, 11ᵇ together with the insulation 14, 15 and the small copper plate or terminal 18, 18ª all of which are secured in position on the socket 29 by means of the nut 19, the smaller diameter portion of the socket 29 being screw-threaded to receive the said nut. As shown more clearly in Fig. 5 each of the sockets 29 and 29ª has formed on its inner closed end a reduced diameter portion which constitutes a head or short spigot or dowel 32 adapted to be inserted in a hole provided centrally in the plate or clamping member 33 to which the said sockets 29 and 29ª with the pivots 30 and springs 31 therein are secured respectively to the upper and lower transverse portions of the moving coil or frame 28 as hereinbefore described. The said head 32 on the inner end of each of the socket members 29, 29ª when inserted in the hole in the clamping plate 33 is upset or riveted over so that the said sockets, together with their associated parts, are secured to the said clamping plates. As clearly shown in Fig. 5 the horizontal portion of the hereinbefore-mentioned small copper plate or terminal 18, having the vertical or depending extension or tongue 18$^b$, is held between the end face or shoulder of the larger diameter portion 29$^b$ of the socket 29$^a$ and the clamping plate 33, the said small copper plate having a central hole by which it is passed into position over the head 32 of the socket 29$^a$ before the latter is secured to the plate 33.

Further according to this invention each of the pivots 30 has a relatively long and sharp or acute-angled conical point 30$^a$, and means on the outer ends of the sockets 29 and 29$^a$ retains the said pivots in the said sockets. In the embodiment illustrated the said means consists of a formation of the outer ends of the sockets 29, 29$^a$ such that the bore or cavity at the outer end of the socket is of less diameter than the cylindrical inner portions of the pivots 30 so that the metal at the outer end of each socket embraces the conical point 30$^a$ of the pivot adjacent to the inner end or base of the said point. This formation of the outer ends of the sockets 29 and 29$^a$ may be provided by spinning over the metal of the sockets at the outer ends or edges of the cavities therein after the pivots 30 and springs 31 have been inserted therein so as to form inwardly projecting stops $s$ as shown in Fig. 5.

Each of the above-mentioned clamping plates 33, together with the spindle parts or pivot comprising the sockets 29, 29$^a$, respectively, pivots 30 and springs 31, together with the small copper plates, terminals or tags having the vertical tongues or projections 18$^a$, 18$^b$, is secured in position on the transverse part of the moving coil 28 by having the end portions 33$^a$ and 33$^b$ of the plate bent or folded over on the said transverse parts of the moving coil as clearly shown in Fig. 1 and pressed or clamped tightly thereon, a strip of suitable insulating material, for instance mica, being interposed between each of the plates 33 and the transverse portions of the moving coil 28 on which they are mounted.

As clearly shown in Fig. 6 the jewel bearing 24 and the metal insert or bush 25, located and held in the cavity in each of the screw plugs or pillars 23 as hereinbefore described, are so formed as to provide therein a V-shaped or conical recess 34 the angle of which is very much greater than that of the conically pointed end 30$^a$ of the pivot 30, so that only the extreme point of the pivot contacts with or bears on the jewel 24 at the apex or extreme inner end of the recess 34.

It will be seen that as shown in Figs. 1 and 2, the depth of the conical recess 34 in each pivot bearing is approximately equal to the length of the sharp conically pointed end 30$^a$ of the pivots 30, and that the depth of the said recesses 34 is much greater than the distance between the ends of the sockets 29, 29$^a$ and the adjacent ends of the screw plugs or pillars 23 which latter, as hereinbefore-mentioned, together with the jewels 24 and metal inserts 25, constitute fixed adjustable bearings for the pivots 30 on the upper and lower ends of the moving coil 28.

The stirrup frame 1, with the various parts or devices carried thereby and hereinbefore described with reference to and illustrated in Figs. 1, 2 and 3 of the drawings, is inserted in the aperture or space between the usual pole pieces attached to the side members or legs of the usual "horse-shoe" magnet which, as usual, is arranged horizontally in the frame or casing of the instrument, the top ring or flange 4 of the stirrup frame 1 being secured to the top face or side of the pole pieces by screws, 35, Fig. 3, being holes in the top ring or flange 4 of the stirrup frame which receive said screws. As the form and arrangement of the horse-shoe magnet with its pole pieces, and the location and method of fixing the stirrup frame to the pole pieces, are well known it is deemed to be unnecessary to illustrate the same in the drawings.

The pivots 30 slidable in the sockets 29, 29$^a$, respectively on the upper and lower ends of the moving coil 28, and backed by the springs 31 provide a spindle support for the moving coil which, should the instrument be subjected to jarring shocks, prevents damage to the points of the pivots and to the jewel bearings 24. The provision of the sharp or acute-angled conical point 30$^a$ on each of the pivots 30 and the wide-angled recesses 34 in the bearings are important for reducing friction. The cavity in each bearing pillar 23, in which the jewel 24 is located, is much deeper than the height or thickness of the jewel, and it will be appreciated that the provision of the metal insert, ring or bush 25 by which the jewel is held in place in the recess in each pillar 23 enables a thin or shallow jewel to be employed. Further owing to the depth of the conical recess 34, formed partly in the jewel bearing 24 and partly in the metal insert or ring 25, being nearly equal to the length of the conical point 30$^a$ on the pivot and being much greater than the distance between the outer end of the socket 29, respectively 29$^a$, and the adjacent end of the bearing pillar 23, it is impossible for the pivot points to jump or to be jarred out of their bearings by the heaviest jarring shocks to which the instrument may be subjected. The springs 31 are made of predetermined strength so as to press the pivot stems 30 against the stops $s$ on the pillars, and permits the stems to retract when the instrument is subjected to sudden jar, as by being dropped accidentally on a hard floor. Instruments of this sort are small and portable and are often dropped accidentally in using them. The end of the pillar is arranged to strike the end of the socket 23 and limit the retraction of the spring 30 before the spring is injured or broken. The springs 31 do not normally press the jewels hard against the points of the pivots, and there is no spring-brake action between the pivots and their bearings. The depth and wide angle of the conical recesses 34 in the bearings relative to the conical points 30ª of the pivots provide an arrangement whereby the pivots are self-centering in the bearings.

The provision of the means on the ends of the sockets 29, 29ª whereby outward movement of the pivots 30 relative to the sockets is limited and the pivots are retained in the sockets not only prevents the pressure of the springs 31 on the pivots being transmitted to the jewel bearings 24, but also enables minute clearance, for instance one-thousandth of an inch, to be provided between the extremity of the point 30ª of the pivot 30 on the upper end of the moving coil 28 and the apex or base of the conical recess in the jewel bearing of this pivot, whereby friction is reduced to a minimum which is very important for attaining the highest degree of sensitiveness and accuracy in the working of the instrument.

What I claim is:—

1. In a measuring instrument, a main frame, pivot bearings on the ends of the main frame, a coil frame having ends which are spaced apart, a tubular pillar provided with a stop and having its inner end secured to one end of the coil frame, a pivot slidable in the tubular pillar and engaging with one of the pivot bearings, a spring operating to normally hold the pivot pressed outwardly against the said stop and engaging lightly with the pivot bearing, and a pivot projecting at the other end of the coil frame and engaging with the other bearing on the main frame.

2. In a measuring instrument, a main frame, pivot bearings on the ends of the main frame, a coil frame having ends which are spaced apart, a tubular pillar provided with a stop and having its inner end secured to one end of the coil frame, a pivot slidable in the tubular pillar and engaging with one of the pivot bearings, a spring operating to normally hold the pivot pressed outwardly against the said stop and engaging lightly with the pivot bearing, the end of the tubular pillar being arranged to strike the end of the pivot bearing and limit the amount of the retraction of the pivot under sudden jar and thereby prevent injury to the spring, and a pivot projecting at the other end of the coil frame and engaging with the other bearing on the main frame.

3. A combination of parts as set forth in claim 1, the said tubular pillar being secured to the said coil frame by a clamping plate of flexible metal the end portions of which are bent around one end portion of the said coil frame, and said clamping plate and pivot being insulated from the coil frame.

4. A combination of parts as set forth in claim 1, the said tubular pillar having a reduced outer end portion and a shoulder on its main portion, an insulated arm pivoted on the said end portion, a contact member mounted on the said end portion, and a nut screwed on the outer part of the said end portion and retaining the contact member and arm in position.

5. A combination of parts as set forth in claim 2, one of the said pivot bearings being provided with an end cavity, a jewel for the point of the pivot to bear on arranged in the cavity, and a ring clamped in the cavity and retaining the jewel in place, the depth of the ring through which the pivot projects being greater than the said amount of retraction of the pivot, thereby preventing the disconnection of the pivot from the pivot bearing.

6. In a measuring instrument, a main frame, adjustable pivot bearings mounted on the ends of the main frame, a coil frame having ends which are spaced apart, tubular pillars secured to the ends of the coil frame and provided with stops, pivots slidable in the tubular pillars and engaging with the pivot bearings, and springs operating normally to hold the pivots pressed outwardly against the said stops and engaging lightly with the pivot bearings, the ends of the tubular pillars being arranged to strike the ends of the pivot bearings and limit the amount of retraction of the pivots under sudden jar and thereby prevent injury to the springs.

In testimony whereof I affix my signature.

WALTER RICHARD MATTHEWS.